Patented Dec. 7, 1948

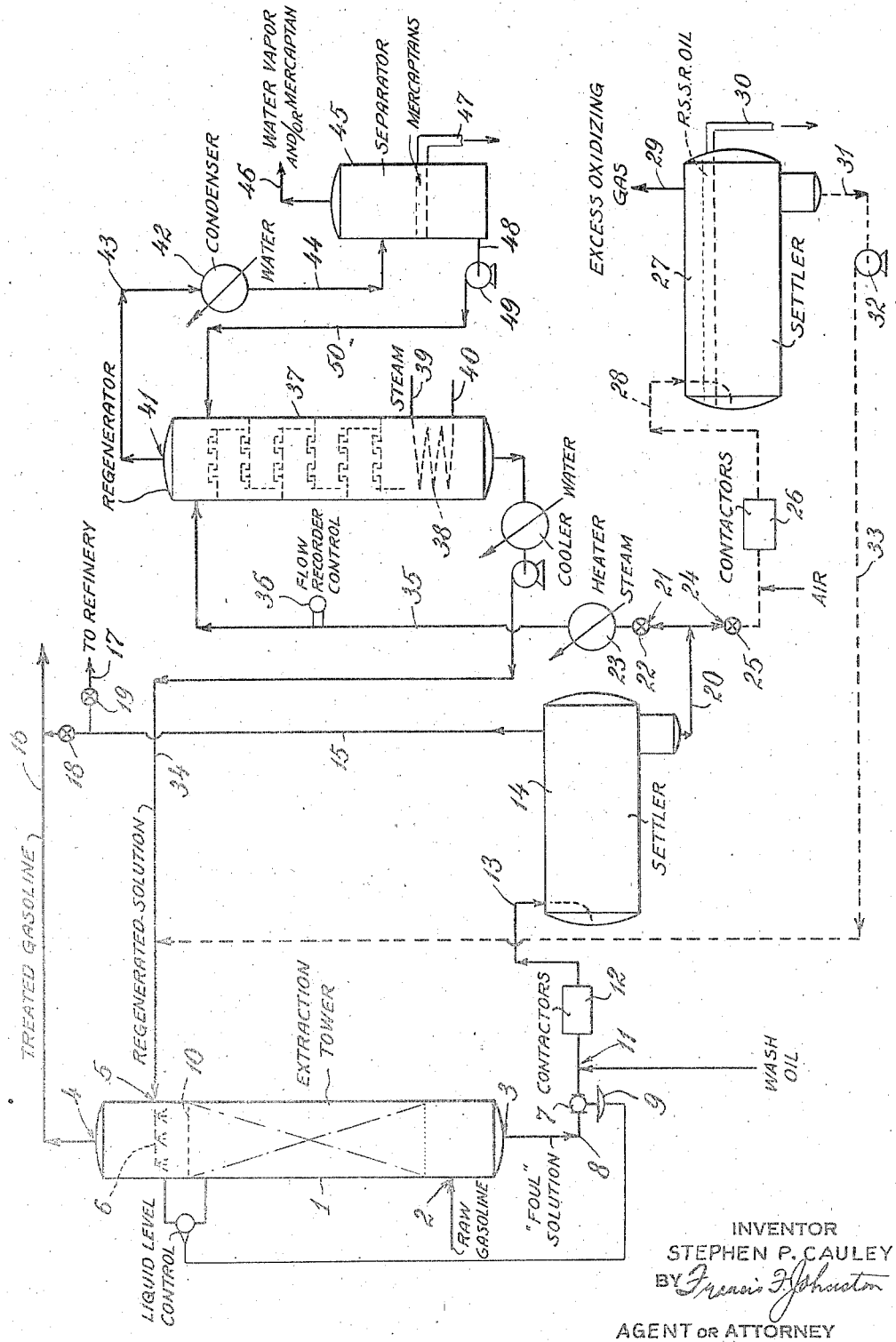

2,455,656

UNITED STATES PATENT OFFICE 2,455,656

PRODUCTION OF COMMERCIALLY PURE MERCAPTANS AND DISULFIDES

Stephen P. Cauley, Garden City, N. Y., assignor to Socony-Vacuum Oil Company, Incorporated, a corporation of New York Application June 19, 1945, Serial No. 600,245

12 Claims. (Cl. 260—608)

The present invention relates to the recovery of mercaptans and disulfides of commercially pure grade from alkaline solutions which have been used in the treatment of hydrocarbons.

The increasing number of uses for mercaptans in the chemical industries has resulted in an appreciable demand for these materials in a relatively pure state. However, present methods of producing relatively pure mercaptans involve chemical syntheses and are expensive.

There is a large volume of mercaptans and/or their respective alkyl disulfides being produced from treatment of gasoline. This is an ideal source but these materials are highly contaminated with hydrocarbons boiling at the same temperatures, and purification by distillation is impractical.

The present methods of extracting mercaptans involve contacting the oil being treated with a suitable aqueous alkaline solution to extract a major portion or all of the mercaptans present. The aqueous phase is then separated from the oil and regenerated by steaming to remove the mercaptans, as such, or by air blowing to convert the mercaptans to disulfides which are recovered by settling or other means. In both cases the recovered sulfur compounds are contaminated. This contamination is due to the presence of a comparatively high concentration of entrained oil in the aqueous treating solution after being separated from the oil. A major portion of this oil is recovered with either the mercaptan or disulfide material.

The average concentration of mercaptan or disulfide in the totally recovered phase is normally less than 50 per cent. This is due to the fact that entrained oil in the treating solution may vary between 0.1 per cent to 1.5 per cent by volume, which corresponds to the same general limits of mercaptan removal during regeneration.

Some improvement in purity of mercaptans and disulfides could be obtained by dilution of the "fat" treating solution with water prior to regeneration. This would result in lowering of viscosity and "holding power" of the solution for the contaminating oil. However, in such a method, it would be necessary to evaporate the same quantity of water from the mercaptan-free solution to return it to its original efficiency for mercaptan removal. This in effect would be limiting the flexibility of the primary treating operation, and is not desirable.

It is an object of the present invention to provide a method for removing impurities from aqueous alkaline treating solutions containing mercaptan-sulfur which, in the conventional or customary procedure of solution regeneration, prevent the production of commercially pure aliphatic or aromatic mercaptans or alkyl or aryl disulfides. It is another object of the present invention to provide a method for recovering commercially pure mercaptans or disulfides from alkaline treating solutions without substantial degradation of the product. It is a further object of the present invention to provide a method for recovering commercially pure mercaptans or disulfides from alkaline treating solutions without substantial limitation of the flexibility of the normal treating processes or the normal functions thereof. Other objects and advantages will become apparent from the following description taken in conjunction with the drawing which is a more or less diagrammatic flowsheet of one embodiment of the present invention.

In general the novel method comprises extracting mercaptans from hydrocarbons, particularly mineral oil and mineral oil fractions, with an aqueous alkaline solution containing, or devoid of, substances such as alkali metal salts of isobutyric acid, alkali metal salts of hydroxylated aromatic compounds, such as the cresols, alkanolamines and the like well known to the art, which increase the solubility of mercaptans in, or increase the solvating power of, aqueous alkaline solutions. Such aqueous alkaline solutions contain substantially the same amount of entrained sulfur-free hydrocarbon oil as mercaptans and the hydrocarbons are of substantially the same boiling point as the mercaptans. Thus, an alkaline treating solution containing $C_1$ to $C_4$ mercaptans will contain $C_4$ to $C_7$ hydrocarbons having a boiling range so close to that of the corresponding mercaptans that separation by fractional distillation is impracticable. The hydrocarbons and mercaptans can be separated from the alkaline solution but the resulting mixture of mercaptans and hydrocarbons does not even approximate a commercially pure mercaptan mixture.

In the prior art methods of removing mercaptan sulfur from hydrocarbon mixtures the aqueous alkaline solution, fouled by the presence of the extracted mercaptans, is regenerated for further use as an extracting solution either by steaming to remove the mercaptans and hydrocarbons or by oxidation of the mercaptans to disulfides followed by the removal of the disulfides and the contaminating hydrocarbons.

The present invention, on the other hand, provides for contacting the foul alkaline solution with a hydrocarbon or mixture of hydrocarbons which boils at a lower temperature than that of the lowest boiling mercaptan or disulfide to be obtained in the pure state. The foul alkaline solution is contacted with the aforesaid hydrocarbon or mixture of hydrocarbons prior to regeneration of the alkaline solution and in sufficient amount to materially reduce the concentration of original hydrocarbon impurities in the alkaline solution. This step is not to be confused with the prior art practice of washing alkaline solutions, particularly those regenerated by oxidation, after regeneration to remove disulfides and/or elementary sulfur to prevent contamination of the material to be subsequently treated by extraction of the disulfides and/or elementary sulfur from the regenerated alkaline solution. Such washing has not been done prior to regeneration but has been done after regeneration. Furthermore, in the prior art practice of washing the alkaline solution after regeneration the hydrocarbon washing liquid has been chosen at random solely on the basis of its solvent power for elementary sulfur or disulfides and not especially selected on the basis of the relative boiling range of the hydrocarbon washing liquid and the boiling range of the mercaptans and/or disulfides contained in the regenerated alkaline solution.

After contacting the alkaline solution with the liquid hydrocarbon, the mixture may be steamed or the hydrocarbons and mercaptans or disulfides separated in any suitable manner. The mixture of added hydrocarbon, extracted hydrocarbons and mercaptans or disulfides is then fractionated to provide an overhead of added hydrocarbon and a residue of mercaptan or disulfide and that portion of the extracted hydrocarbon which has not remained dissolved in the alkaline solution. In other words, the solubility of hydrocarbons in the customary, conventional alkaline treating solutions is substantially the same regardless of boiling point. Consequently, the concentration of original oil in the mercaptans or disulfides recovered as an overhead is reduced. This can be more readily understood by a numerical illustration.

Thus, aqueous alkaline treating solutions normally used for the removal of mercaptans from gasoline contain from about 0.1 per cent to about 1.5 per cent by volume of the oil being treated and from about 0.05 per cent to about 1.5 per cent by weight of mercaptide sulfur, after separation from the gasoline following contact therewith. These values vary because of differences in the types of treating solutions used, mercaptan content of the gasolines treated and other operating variables.

To illustrate the practical application of the present invention by means of a numerical example of conditions often encountered in mercaptan removal operations, let it be assumed that the ratio of treating solution to gasoline is 1:5, that the spent treating solution contains 0.3 per cent by volume of the gasoline being treated which includes among its constituents hydrocarbons having from four to twelve carbon atoms in the molecule, that the mercaptans present in the gasoline to be treated have from one to seven carbon atoms per molecule, and that the total mercaptide sulfur concentration of the fat treating solution to be reduced by regeneration is 0.1 per cent by weight or approximately 0.25 per cent by volume of mercaptans.

In order to produce a mercaptan or disulfide oil of commercially chemically pure grade, i. e. 95 per cent mercaptans or disulfides or better as a by-product of regeneration, the concentration of original hydrocarbons or oil in the aqueous treating solution must be reduced prior to regeneration to less than 0.013 per cent by volume by means of dilution with the washing liquid. The treating solution is therefore contacted with about 10 per cent by volume of hydrocarbon washing material in a separate system before regeneration to obtain substantially complete equilibrium. After the mixture of hydrocarbon washing material and aqueous treating solution has reached equilibrium, the hydrocarbon washing material is separated from the aqueous treating solution. After separation the washed aqueous treating solution still contains 0.25 per cent by volume mercaptans and a total of approximately 0.3 per cent by volume of hydrocarbons. A portion of these hydrocarbons are those derived from the hydrocarbon washing material and the remainder are the hydrocarbons originally present in the unregenerated aqueous treating solution. The 0.3 per cent by volume of hydrocarbons in the washed aqueous treating solution is composed of 0.009 per cent by volume of hydrocarbons originally present in the aqueous treating solution before washing with the hydrocarbon washing material and 0.291 per cent by volume of hydrocarbons from the hydrocarbon washing material. In other words, the washed aqueous treating solution before regeneration will retain substantially all of the mercaptides originally present as they have a chemical bond with the solution and about 0.3 per cent by volume of the hydrocarbons derived partially from those originally present in the aqueous unregenerated treating solution and partially from the hydrocarbon washing material. The hydrocarbons of the mixture are composed of 100 (0.3/10.3) = 2.91 per cent by volume of the original hydrocarbons and 100 (10/10.3) = 97.09 per cent by volume of hydrocarbons of the washing material. Therefore, the aqueous washing material will contain .0291×0.3=.009 per cent by volume original hydrocarbons and .9709×0.3= .291 per cent by volume hydrocarbons of the washing material.

The washed aqueous treating solution may then be steamed in a conventional manner of solution regeneration to recover an overhead comprising hydrocarbons from the washing material, the residual original hydrocarbons and the mercaptans. This overhead will have the following composition:

|  | Percent by volume of aqueous solution | Per cent by volume of overhead |
|---|---|---|
| Washing material | .291 | 52.91 |
| Mercaptans | .250 | 45.45 |
| Original hydrocarbons | .009 | 1.64 |
|  | .550 | 100.00 |

The overhead can be fractionated into two cuts: the first cut comprising the hydrocarbons from the washing material and the second cut composed of commercially pure mercaptans having a purity of $$100\left(\frac{45.45}{47.09}\right)=96.5 \text{ per cent}$$

If regeneration of the aqueous treating solution is to be effected by steaming and the initial mercaptan to be obtained in relatively purified state is methyl mercaptan which has a boiling point of 43.2 degrees Fahrenheit at atmospheric pressure, the washing material must be a liquid having a boiling point at least 10° F. lower than that of methyl mercaptan. It is preferred to use propane or a lighter hydrocarbon as the washing material. Under these conditions the overhead will be comprised of:

|  | Per cent by volume | B. P., °F. 760 mm. Hg ABS |
|---|---|---|
| Propane | 52.91 | −44. |
| Mercaptans | 45.45 | 43 to 420. |
| Original hydrocarbons | 1.64 | 10 to approximately 420. |

This material can be fractionated readily to remove all the propane leaving a mercaptan oil of approximately 96.5 per cent purity.

When disulfides are to be recovered, the washed solution containing a reduced amount of the hydrocarbons originally present is regenerated by oxidation and the disulfides being insoluble are recovered by means of settling or any other suitable method. The degree of purity of the recovered disulfides is the same as that of the mercaptans.

The washing liquid in all cases may be returned to the refinery fractionation equipment for recovery. When disulfides are to be recovered the washing liquid may be added directly to the treated gasoline or other petroleum fraction.

The foregoing discussion illustrates the broad concept that the hydrocarbon washing material is selected on the basis of the boiling point of the most volatile mercaptan present in the unregenerated aqueous treating solution or upon the boiling point of the most volatile disulfide which will be produced by oxidizing during regeneration the mercaptans originally present in the aqueous treating solution. Thus when the mercaptan to be obtained in relatively pure state, i. e. commercially pure, is a mixture of butyl mercaptans containing t-butyl mercaptan which has a boiling point at atmospheric pressure of about 149° F., the hydrocarbon washing liquid may have a final boiling point of approximately 140° F. On the other hand, if it is proposed to recover disulfides of commercial purity in which disulfides to be recovered after regeneration by oxidation dimethyl disulfide is present, other hydrocarbon washing materials may be employed to wash the unregenerated aqueous treating solution. This hydrocarbon washing liquid may be selected on the basis of the boiling point of dimethyl disulfide which has a boiling point of 240.8° F. Under these circumstances the hydrocarbon washing material may have a final boiling point of approximately 230° F. Similarly, when the initial mercaptan to be obtained in relatively pure state, i. e. commercially pure, is a mixture of butyl mercaptans containing t-butyl mercaptan having a boiling point at atmospheric pressure of about 149° F., the hydrocarbon washing liquid may have a final boiling point of approximately 140° F. In general, the differential in boiling point between the end point of the hydrocarbon washing material and the most volatile mercaptan or disulfide is about 10 degrees to about 215 degrees Fahrenheit. That is, when precise highly efficient fractionating equipment is used a differential of 10 degrees Fahrenheit provides satisfactory results. On the other hand, when present day industrial fractionating equipment is used a differential of about 45 degrees to about 215 degrees Fahrenheit is necessary to obtain a satisfactory separation.

In order that those skilled in the art may readily visualize the sequence of operations of one embodiment of the present invention, the more or less diagrammatic flow sheet of the drawing has been provided. Those skilled in the art will recognize that the principles of the present invention can be applied to the treatment of any aqueous alkali treating solution containing mercaptides and hydrocarbon impurities of substantially the same boiling point as the contained mercaptans and that under such circumstances the process of the present invention does not involve the steps necessary to obtain the fouled or fat aqueous treating solution.

As in the usual or conventional process for removing mercaptans and the like from petroleum fractions such as gasoline, the extraction tower 1 is filled with aqueous alkali metal hydroxide solution containing solutizers or devoid of solutizers. Raw gasoline containing mercaptans is introduced into tower 1 at a point 2 below the mid point of the tower but sufficiently above the bottom thereof that no material amount of the petroleum fraction is carried out of the tower with the fouled or fat aqueous solution containing the dissolved mercaptans. The fat aqueous solution leaves the tower at 3. The raw petroleum fraction, for example, gasoline rises in the tower and is withdrawn at 4. In a continuous operation regenerated or lean aqueous alkali metal hydroxide solution is introduced into tower 1 at 5 by means of sprays 6. In order to maintain proper operational balance a valve 7 is placed in line 8 through which the fouled or fat aqueous solution is withdrawn from the bottom of tower 1. Valve 7 is controlled by the conventional liquid level control 9 whereby valve 7 is opened and closed to maintain the upper level of the aqueous treating solution approximately as indicated by dotted line 10.

The fat or fouled aqueous treating solution is withdrawn through line 8 and at 11 hydrocarbon washing material such as propane or the like as indicated hereinbefore is introduced. The mixture of hydrocarbon washing material and fat aqueous solution passes to contactors 12 which may be of any suitable type to provide intimate contact between the fat treating solution and the hydrocarbon washing material and to permit reaching an equilibrium between the hydrocarbon washing liquid and the fat aqueous treating solution. After a state of substantial equilibrium is reached in contactors 12 the mixture of washing liquid and aqueous treating solution is passed through conduit 13 to settler 14 where the washing liquid is withdrawn through pipe 15 and either introduced into pipe 16 through which the treated fraction is withdrawn from tower 1 or passed directly to the refinery through conduit 17. The foregoing choice is controlled by valves 18 and 19 and dictated by the composition of the liquid withdrawn through 15.

The washed fat aqueous treating solution is withdrawn from the settler 14 by line 20. The washed fat aqueous solution then passes either through line 21 controlled by valve 22 to heater 23 for separation of mercaptans by steaming or through line 24 controlled by valve 25 to contactors 26 wherein the mercaptans are oxidized to disulfides by oxidizing gas such as oxygen, air or the like in the presence of a catalyst such as polyhydroxy aromatic compounds, for example, hydroquinone, catechol, pyrogallol, resorcinol, anthragallol and the like or tannic acid, tannins and similar compounds or broadly polyhydroxy benzene carboxylic acid and esters, derivatives and condensation products thereof.

The washed aqueous treating solution after oxidation of the mercaptans to disulfides in contactors 26 is then transferred to a settling tank 27 in any suitable manner as by line 28. Excess oxidizing gas is withdrawn from settler 27 when necessary by means of conduit 29. The commercially pure disulfides are withdrawn from settler 27 in any suitable manner as by overflow pipe 30. After separation of the commercially pure disulfides the regenerated aqueous treating solution is withdrawn from settler 27 through pipe 31 by pump 32 and returned to tower 1 by lines 33 and 34. Of course, the regenerated solution can be withdrawn from settler 27 and returned to tower 1 in any other suitable manner.

When it is desirable or necessary to recover the mercaptans as commercially pure mercaptans rather than as disulfides, the fat or foul aqueous treating solution is withdrawn from settler 14 after the removal of excess hydrocarbon washing liquid and passed into heater 23. In heater 23 the temperature of the fat aqueous treating solution is raised to about 220 to about 270 degrees Fahrenheit. The heated aqueous solution is withdrawn from heater 23 through line 35 under control of flow recorder control device 36 of customary and conventional design to regenerator 37.

In regenerator 37 the heated aqueous solution containing mercaptans and impurities in commercially acceptable quantities are vaporized by the heat introduced by means of steam coil 38 having inlet 39 and outlet 40. As is usual practice in regeneration by steaming an overhead of mercaptans, impurities and water is taken off at 41. However, it must be emphasized that whereas in conventional steaming regeneration the mercaptans contain about 50 per cent commercially inseparable impurities, the present overhead contains a maximum of 10 per cent impurities and preferably a maximum of 5 per cent impurities.

The overhead is passed to condenser 42 by any suitable means such as line 43. The condensate thereof flows through line 44 to separator 45 where the mercaptans are separated from the water of the overhead. When the composition of the condensate warrants it, water vapor and/or low boiling range mercaptans are withdrawn from separator 45 as overhead through pipe 46. The heavier mercaptans are withdrawn through an overflow pipe 47 and condensed water through line 48. Pump 49 returns the aqueous condensate from separator 45 through line 50 to regenerator 37 as reflux.

In view of the foregoing description, those skilled in the art will understand that the present novel method of recovering mercaptans and/or disulfides from aqueous treating solution containing mercaptans contaminated with impurities boiling within the boiling range of the mercaptans and present in commercially unacceptable amounts, comprises contacting the fat aqueous treating solution prior to regeneration thereof with hydrocarbon material having a boiling range sufficiently lower than the boiling point of the most volatile mercaptan or disulfide to be recovered that the hydrocarbon material can be readily separated by distillation and thereafter recovering the mercaptans and/or disulfides.

It will also be understood by those skilled in the art that when it is desirable or necessary to recover the mercaptans in the form of their disulfides the mercaptans are oxidized to disulfides after the aqueous treating solution has been treated with the hydrocarbon material having a boiling range below that of the most volatile disulfide to be recovered.

It will be understood that when the hydrocarbon treating material is not volatile at ambient temperatures and atmospheric pressure the hydrocarbon treating material is recovered with the mercaptans and/or disulfides and then separated by a simple fractionation.

I claim:

1. The method of treating aqueous alkaline solutions to obtain commercially pure sulfur compounds which alkaline solutions have been used to extract acidic sulfur compounds from hydrocarbon fluids and which contain hydrocarbon impurities of substantially the same boiling range as said acidic sulfur compounds in commercially unacceptable amounts which comprises contacting said aqueous solution before regeneration with hydrocarbon treating material having a boiling range differential of at least 10 degrees from that of the sulfur bearing compound to be recovered and separating said hydrocarbon treating material and said sulfur compound from said aqueous treating solution.

2. The method of treating aqueous alkaline solutions to obtain commercially pure sulfur compounds which alkaline solutions have been used to extract acidic sulfur compounds from hydrocarbon liquids and which solutions contain hydrocarbon impurities of substantially the same boiling range as said acidic sulfur compounds in commercially unacceptable amounts which comprises contacting such aqueous solution before regeneration with a hydrocarbon treating material having a boiling range end point about 10° F. to about 215° F. below that of the boiling point of the most volatile sulfur bearing compound to be recovered, separating said hydrocarbon treating material and said sulfur compound from said aqueous treating solution, and separating said sulfur bearing compound from said hydrocarbon treating material by distillation.

3. The method of treating aqueous alkaline solutions to obtain commercially pure sulfur compounds which alkaline solutions have been used to extract acidic sulfur compounds from hydrocarbon fluids and which solutions contain hydrocarbon impurities of substantially the same boiling range as said acidic sulfur compounds in commercially unacceptable amounts which comprises contacting said aqueous solution before regeneration with a hydrocarbon treating material having a boiling range end point at least 10° F. lower than the boiling point of the most volatile sulfur compound to be recovered, the volume of said hydrocarbon treating material being such that when equilibrium is reached the concentration of the aforesaid impurities will be reduced to predetermined amounts, separating sulfur compounds from said aqueous treating solution, said hydrocarbon treating material and commercially unacceptable amounts of hydrocarbon impurities, and separating sulfur compounds from hydrocarbon treating material by distillation.

4. The method of treating aqueous alkaline solutions to obtain commercially pure sulfur compounds which alkaline solutions have been used to extract acidic sulfur compounds from hydrocarbon fluids and which contain hydrocarbon impurities of substantially the same boiling range as said acidic sulfur compounds in commercially unacceptable amounts which comprises contacting said aqueous solution before regeneration with a hydrocarbon treating material having a boiling range end point at least 10° F. lower than the boiling point of the most volatile sulfur compound to be recovered until equilibrium is practically established, separating the bulk of said hydrocarbon treating material from said aqueous treating solution, and recovering sulfur compounds of commercially acceptable purity.

5. The method of treating aqueous alkaline solutions to obtain commercially pure sulfur compounds which alkaline solutions have been used to extract mercaptans from hydrocarbon fluids and which contain hydrocarbon impurities of substantially the same boiling range as said mercaptans in commercially unacceptable amounts which comprises contacting said aqueous solution before regeneration with hydrocarbon treating material having a boiling range end point at least 10 degrees lower than the most volatile mercaptan, the volume of said hydrocarbon treating material being such that when equilibrium is reached the concentration of the aforesaid impurities will be reduced to predetermined amounts, steaming said washed aqueous treating solution to obtain as overhead a mixture of hydrocarbon treating material, mercaptans and hydrocarbon impurities in reduced amounts and separating said mercaptans and hydrocarbon impurities from said hydrocarbon treating material to obtain mercaptans of commercially acceptable purity.

6. The method of treating aqueous alkaline solutions to obtain commercially pure sulfur compounds which alkaline solutions have been used to extract acidic sulfur compounds from hydrocarbon fluids and which contain hydrocarbon impurities of substantially the same boiling range as said sulfur compounds in commercially unacceptable amounts which comprises contacting an aqueous alkaline solution containing mercaptides before regeneration with a hydrocarbon treating material having a boiling range end point at least 10 degrees lower than the most volatile dialkyl disulfide to be recovered, the volume of said hydrocarbon treating material being such that when equilibrium is reached the concentration of said hydrocarbon impurities will be reduced to predetermined amounts, separating the bulk of said hydrocarbon treating material from said aqueous treating solution, regenerating said aqueous alkaline solution by oxidation to convert at least a portion of said mercaptides to dialkyl disulfides, and separating said dialkyl disulfides in commercial purity.

7. The method of producing sulfur compounds of commercial purity from petroleum fractions containing mercaptans which comprises contacting a petroleum fraction containing mercaptans with an aqueous alkaline treating solution to extract said mercaptans from said petroleum fractions and to obtain a fat aqueous treating solution containing mercaptan sulfur and impurities of substantially the same boiling range as said mercaptans in commercially unacceptable amounts, separating said fat aqueous treating solution from said treated petroleum fraction, contacting said fat aqueous treating solution prior to regeneration with hydrocarbon washing material having a boiling range end point at least 10 degrees lower than the most volatile sulfur compound to be recovered that said hydrocarbon treating material can be separated from said sulfur compound by distillation, the volume of said hydrocarbon treating material being sufficient to reduce the concentration of said impurities to predetermined amounts at equilibrium, and recovering sulfur compounds in commercial purity.

8. The method of producing disulfides from petroleum fractions containing the corresponding mercaptans which comprises contacting a petroleum fraction containing mercaptans with an aqueous alkaline treating solution to extract mercaptans from said petroleum fraction and to obtain a fat aqueous treating solution containing said mercaptans and impurities of substantially the same boiling range in commercially unacceptable amounts, contacting said fat aqueous treating solution prior to regeneration with hydrocarbon treating material having a boiling range end point at least 10 degrees lower than the most volatile disulfide to be produced to permit separation of said hydrocarbon treating material and disulfides to be produced by distillation, the volume of said hydrocarbon treating material being such as to reduce the concentration of impurities to predetermined amounts at equilibrium, separating the bulk of said hydrocarbon treating material from said fat aqueous treating solution, oxidizing said mercaptides in said fat aqueous treating solution to disulfides and separating disulfides of commercial purity from said fat aqueous treating solution.

9. The method of producing disulfides from petroleum fractions containing the corresponding mercaptans which comprises contacting a petroleum fraction containing mercaptans with an aqueous alkaline treating solution to extract mercaptans from said petroleum fraction and to obtain a fat aqueous treating solution containing said mercaptans and impurities of substantially the same boiling range in commercially unacceptable amounts, contacting said fat aqueous treating solution prior to regeneration with hydrocarbon treating material having a boiling range end point at least 10 degrees lower than the most volatile disulfide to be produced to permit separation of said hydrocarbon treating material and disulfides to be produced by distillation, the volume of said hydrocarbon treating material being such as to reduce the concentration of impurities to predetermined amounts at equilibrium, separating the bulk of said hydrocarbon treating material from said fat aqueous treating solution, and oxidizing said mercaptides in said fat aqueous treating solution to disulfides in the presence of an organic oxidation promoter.

10. The method of producing disulfides from petroleum fractions containing the corresponding mercaptans which comprises contacting a petroleum fraction containing mercaptans with an aqueous alkaline treating solution to extract mercaptans from said petroleum fraction and to obtain a fat aqueous treating solution containing said mercaptans and impurities of substantially the same boiling range in commercially unacceptable amounts, contacting said fat aqueous treating solution prior to regeneration with hydrocarbon treating material having a boiling range end point at least 10 degrees lower than the most volatile disulfide to be produced to permit separation of said hydrocarbon treating material and disulfides to be produced by distillation, the volume of said hydrocarbon treating material being such as to reduce the concentration of impurities to predetermined amounts at equilibrium, separating the bulk of said hydrocarbon treating material from said fat aqueous treating solution, and oxidizing said mercaptans in said fat aqueous treating solution to disulfides in the presence of an organic oxidation promoter selected from the group consisting of polyhydroxy aromatic compounds, polyhydroxy benzene carboxylic acids and esters, derivatives and condensation products of said acids.

11. In the method of reactivating aqueous alkali solution which has been used to extract weakly acidic sulfur compounds from hydrocarbon fluids to obtain a reactivated alkali solution and a mixture of one of the organic sulfur compounds selected from the group consisting of mercaptans and disulfides with hydrocarbons of substantially the same boiling range as said organic sulfur compounds in commercially unacceptable amounts, the improvement which comprises contacting said alkali solution before reactivation with hydrocarbon treating material having a boiling range differential of at least about 10 degrees Fahrenheit from that of the most volatile sulfur compound to be recovered to replace a portion of said hydrocarbon impurities by said hydrocarbon treating material.

12. In the method of reactivating aqueous alkali solution which has been used to extract weakly acidic sulfur compounds from hydrocarbon fluids to obtain a reactivated alkali solution and a mixture of one of the organic sulfur compounds selected from the group consisting of mercaptans and disulfides with hydrocarbons of substantially the same boiling range as said organic sulfur compounds in commercially unacceptable amounts, the improvement which comprises contacting said alkali solution before reactivation with hydrocarbon treating material having a boiling range differential of at least about 45 degrees Fahrenheit to about 215 degrees Fahrenheit from that of the most volatile sulfur compound to be recovered to replace a portion of said hydrocarbon impurities by said hydrocarbon treating material.

STEPHEN P. CAULEY.

REFERENCES CITED

The following references are of record in the file of this patent:

UNITED STATES PATENTS

| Number | Name | Date |
|---|---|---|
| 2,009,554 | La Comble | July 30, 1935 |
| 2,152,724 | Yabroff | Apr. 4, 1939 |
| 2,183,968 | McCormick | Dec. 19, 1939 |
| 2,218,610 | Hewlett | Oct. 22, 1940 |
| 2,228,295 | Yabroff | Jan. 14, 1941 |
| 2,236,928 | Thomas | Apr. 1, 1941 |
| 2,245,317 | Bannerot | June 10, 1941 |